United States Patent
Ortmann et al.

(10) Patent No.: US 11,130,399 B2
(45) Date of Patent: Sep. 28, 2021

(54) MULTI-CLUTCH DEVICE AND HYBRID MODULE FOR A MOTOR VEHICLE

(71) Applicant: Schaeffler Technologies AG & Co. KG, Herzogenaurach (DE)

(72) Inventors: Simon Ortmann, Baden-Baden (DE); Patrick Oberle, Rheinhausen (DE); Philippe Wagner, Souffelweyersheim (FR); Manuel Bassler, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/051,996

(22) PCT Filed: Apr. 18, 2019

(86) PCT No.: PCT/DE2019/100358
§ 371 (c)(1),
(2) Date: Oct. 30, 2020

(87) PCT Pub. No.: WO2019/223829
PCT Pub. Date: Nov. 28, 2019

(65) Prior Publication Data
US 2021/0229544 A1 Jul. 29, 2021

(30) Foreign Application Priority Data

May 22, 2018 (DE) .......................... 102018112160.1

(51) Int. Cl.
*F16D 25/10* (2006.01)
*B60K 6/387* (2007.10)
*F16D 21/06* (2006.01)

(52) U.S. Cl.
CPC .............. *B60K 6/387* (2013.01); *F16D 21/06* (2013.01); *F16D 25/10* (2013.01);
(Continued)

(58) Field of Classification Search
CPC ......... B60K 6/387; F16D 25/10; F16D 21/06; F16D 2021/0661; B60Y 2200/92; B60Y 2400/424
See application file for complete search history.

(56) References Cited

U.S. PATENT DOCUMENTS

| | | | | |
|---|---|---|---|---|
| 6,454,074 | B1 * | 9/2002 | Kundermann | .......... F16D 33/10 |
| | | | | 192/48.618 |
| 6,464,059 | B1 * | 10/2002 | Kundermann | .......... F16D 25/12 |
| | | | | 192/48.618 |

(Continued)

FOREIGN PATENT DOCUMENTS

| | | |
|---|---|---|
| DE | 102016212846 A1 | 1/2018 |
| DE | 102016125064 A1 | 4/2018 |
| DE | 102016219462 A1 | 4/2018 |

*Primary Examiner* — David J Hlavka

(57) ABSTRACT

A multi-clutch device for a hybrid module includes a separating clutch, a dual clutch device, a first pivot bearing, a common rotary part, a second pivot bearing, a gear element, and a clamping device. The separating clutch is for transmitting torque from an internal combustion engine to the multi-clutch device. The dual-clutch device is for transmitting torque to a drivetrain. The dual clutch device includes a first partial clutch and a second partial clutch. The common rotary part is mounted rotatably by the first pivot bearing, and couples the separating clutch, the first partial clutch, and the second partial clutch in a rotationally fixed manner. The gear element is mounted rotatably by the second pivot bearing, and forms a gear between the electrical machine and the multi-clutch device. The clamping device is for clamping the common rotary part and the gear element against each other in the axial direction.

10 Claims, 1 Drawing Sheet

(52) U.S. Cl.
CPC ..... *B60Y 2200/92* (2013.01); *B60Y 2400/424* (2013.01); *F16D 2021/0661* (2013.01)

(56) References Cited

U.S. PATENT DOCUMENTS

| | | | |
|---|---|---|---|
| 6,471,026 B1 * | 10/2002 | Kundermann | F16D 25/10 192/48.618 |
| 6,491,149 B1 * | 12/2002 | Kundermann | F16D 25/14 192/48.9 |
| 6,499,578 B1 * | 12/2002 | Kundermann | F16D 33/10 192/48.618 |
| 6,523,657 B1 * | 2/2003 | Kundermann | F16D 48/02 192/48.8 |
| 2004/0035666 A1 * | 2/2004 | Grosspietsch | F16D 21/06 192/48.8 |
| 2008/0015085 A1 | 1/2008 | Chapelon et al. | |
| 2009/0223769 A1 * | 9/2009 | Nohl | F16D 25/10 192/48.8 |

* cited by examiner

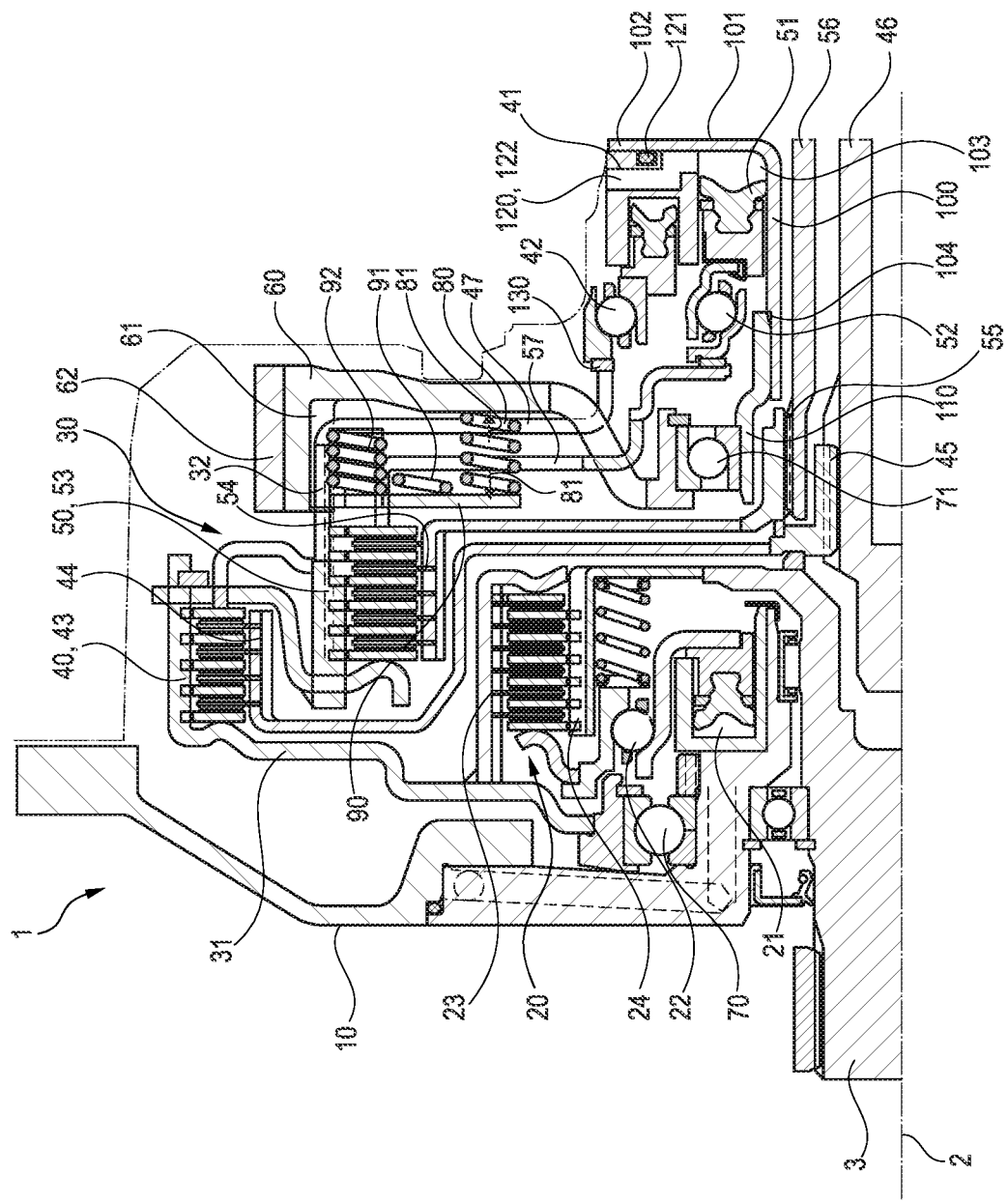

MULTI-CLUTCH DEVICE AND HYBRID MODULE FOR A MOTOR VEHICLE

CROSS-REFERENCE TO RELATED APPLICATIONS

This application is the United States National Phase of PCT Appln. No. PCT/DE2019/100358 filed Apr. 18, 2019, which claims priority to German Application No. DE102018112160.1 filed May 22, 2018, the entire disclosures of which are incorporated by reference herein.

TECHNICAL FIELD

The disclosure relates to a multi-clutch device for a hybrid module, which is provided for a motor vehicle, such as a car, a truck or another utility vehicle, and which is to be coupled to an internal combustion engine. The disclosure also relates to the hybrid module itself, which has the multi-clutch device.

BACKGROUND

A hybrid module generally includes a connecting device for mechanically coupling an internal combustion engine, a separating clutch with which a torque can be transmitted from the internal combustion engine to the hybrid module and with which the hybrid module can be separated from the internal combustion engine, and an electrical machine for generating a drive torque with a rotor and a dual-clutch device, with which a torque can be transmitted from the electrical machine and/or from the separating clutch to a drivetrain. The dual-clutch device includes a first partial clutch and a second partial clutch. An actuation system is assigned to each clutch.

The electrical machine enables the electric drive, the increase of power for the operation of the internal combustion engine and recuperation. The separating clutch and its actuation system ensure the coupling or uncoupling of the combustion engine.

If a hybrid module with a dual clutch is integrated into a drivetrain in such a way that the hybrid module is located in the direction of torque transmission between the internal combustion engine and the gear, the internal combustion engine, the hybrid module, the dual clutch with their actuation systems and the gear must be arranged one behind the other or next to one another in the vehicle. However, such an arrangement occasionally leads to installation space problems.

In order to realize a compact hybrid module with an integrated dual clutch, a construction principle includes arranging the separating clutch and the two partial clutches of the dual clutch radially one inside the other.

DE 10 2016 212 846 A1 discloses a clutch arrangement for a drivetrain of a motor vehicle having an electrical machine and an internal combustion engine, the torque of which can be transmitted to a gear through a clutch assembly. A gear designed as a chain drive is used to transmit a torque from the electrical machine to the clutch arrangement. The abovementioned hybrid modules or clutch devices are subject to operational wear due to the forces acting axially and/or radially and require a certain amount of installation space.

SUMMARY

The disclosure provides a multi-clutch device and a hybrid module equipped with the multi-clutch device for a motor vehicle, which combine a long service life or low-wear operation with an axially small installation space requirement.

The features of the claims may be combined in any technically useful way, including the explanations given in the following description and features of the figures which include additional embodiments of the disclosure.

In connection with the present disclosure, the terms "radial" and "axial" always refer to the axis of rotation of the multi-clutch device.

The disclosure relates to a multi-clutch device for a hybrid module for coupling an internal combustion engine. The multi-clutch device includes a separating clutch with which torque can be transmitted from the internal combustion engine to the multi-clutch device and with which the multi-clutch device can be separated from the internal combustion engine; and a dual-clutch device, with which torque can be transmitted from an electrical machine and/or from the separating clutch to a drivetrain, having a first partial clutch and a second partial clutch. The clutches are coupled to one another in a rotationally fixed manner via a common rotary part. Furthermore, the multi-clutch device includes a gear element for forming a gear between the electrical machine and the multi-clutch device for the purpose of transmitting a rotary movement between the electrical machine and the multi-clutch device.

The common rotary part is mounted rotatably in the axial and/or radial direction by a first pivot bearing and the gear element is rotatably mounted in the axial and/or radial direction by a second pivot bearing. The multi-clutch device also has a clamping device, with which the common rotary part, the gear element, and the first pivot bearing and the second pivot bearing can be clamped against each other in the axial direction.

The clutches and the gear element may be arranged coaxially about a common axis of rotation. The separating clutch and the two partial clutches can thus be arranged radially superimposed on one another.

Furthermore, the separating clutch may be arranged radially internally in relation to the two partial clutches. The common rotary part thus forms the output side of the separating clutch and the input sides of the first partial clutch and the second partial clutch. In an example embodiment, the common rotary part may form the outer plate carriers of all three clutches.

The inner plate carriers of the three clutches are each connected to a shaft. The inner plate carrier of the separating clutch is connected in a rotationally fixed manner to an input shaft, and the two inner plate carriers of the two partial clutches are each connected to an output shaft in a rotationally fixed manner, which can be connected to the gear input shafts of a dual-clutch gear or which form the same. The inner plate carriers of the two partial clutches may be coupled to the respective shafts via toothings.

The axial load may be carried out by introducing a respective compressive force on the common rotary part and on the gear element, aligned in opposite directions. Correspondingly, the common rotary part and the gear element are fixed in their axial positions relative to one another, so that the entire multi-clutch device and a hybrid module configured therewith are stabilized in their individual components in the axial direction.

The clamping device may be supported axially on the gear element on one side and axially on the common rotary part or on a component axially fixed thereto on the other side. The multi-clutch device can thus have a clutch cover, which is axially fixed to the common rotary part or is formed thereby. A clamping device configured as a compression spring or compression spring set may be supported in the axial direction on the clutch cover on one side and on the gear element on the other side. Accordingly, two components—the common rotary part and the gear element—may be axially pressed apart, so that the pivot bearings assigned to them are also axially preloaded accordingly. Pressure pads provided for actuating the two partial clutches can reach through the gear element, for which purpose corresponding recesses are provided in the gear element. Because these components rotate at the same speed, there is no need to worry about interference.

In a further embodiment of the multi-clutch device, the two partial clutches may have compression spring devices, which are axially supported on the clutch cover in order to achieve an automatic opening of the respective partial clutch in the non-actuated state. In an example embodiment, the first pivot bearing may be supported radially and/or axially on a housing of the multi-clutch device, and/or that the second pivot bearing may be supported radially and/or axially on a guide sleeve. This support of the second pivot bearing on the guide sleeve can take place indirectly, namely in that the second pivot bearing is supported radially and/or axially on a bearing sleeve, which in turn is supported radially and/or axially on the guide sleeve. Thus, the guide sleeve can simultaneously form a running surface for a seal of the piston of the actuation system of the first partial clutch with respect to the surroundings.

The housing can also be referred to as a carrier component and delimits the multi-clutch device or a hybrid module equipped therewith axially with respect to an installation space, in which a vibration damper, e.g. a dual mass flywheel, can be or is connected to the hybrid module.

The guide sleeve can axially have a stop, against which the bearing sleeve presses axially under force by the clamping device. However, the disclosure should not be limited to such a stop or shoulder, but a mechanical connection between the bearing sleeve and the guide sleeve by means of a thread or locking rings or similar components can also be realized. In addition to the axial contact, the bearing sleeve can be pressed onto the guide sleeve and a force can be transmitted axially between the bearing sleeve and the guide sleeve in a non-positive manner.

The gear element may be a gear wheel which has an internal toothing. The common rotary part has an external toothing, and the internal toothing of the gear wheel meshes with the external toothing of the common rotary part. The gear wheel also includes an external gear toothing, with which a further gear wheel can be brought into engagement for forming a gear between the electrical machine and the multi-clutch device to transmit a rotary movement between the electrical machine and the multi-clutch device.

In an embodiment of the toothing between the gear wheel of the multi-clutch device and a further gear wheel for forming the gear between the multi-clutch device and the connected electrical machine as helical gearing, the second pivot bearing may absorb axial forces introduced by the helical gearing, so that these axial forces do not need to be borne by the clutches.

At least one of the two partial clutches is assigned an actuation system that is designed concentrically around a common axis of rotation and is also referred to as a CSC (concentric slave cylinder).

In an example embodiment, a first actuation system is assigned to the first partial clutch and a second actuation system is assigned to the second partial clutch, and the two actuation systems superimpose one another radially at least in sections.

At least one actuation system of a partial clutch can be sealed axially with respect to the guide sleeve, which has a radially extending section, by means of an O-ring. The seal accordingly lies axially between a housing component of the actuation system and the radial section of the guide sleeve, and in this way seals the pressure chamber of the respective partial clutch from the surroundings. The housing component can be centered by means of a shaped element on the guide sleeve or its radial section, or alternatively by means of a collar or insertions. To secure the position of the housing component and to ensure tightness, screw connections between the housing component and the guide sleeve can be used to clamp the two components together and, if necessary, to absorb loads from the outside, in particular by the gear element.

The disclosure also provides a hybrid module includes a multi-clutch device according to the disclosure and an electrical machine for generating drive torque with a rotor. The rotor is arranged axially parallel with respect to the axis of rotation of the multi-clutch device and is connected to the multi-clutch device by means of a gear, which includes the gear element of the multi-clutch device.

The hybrid module can be operated by an internal combustion engine connected to an input shaft of the hybrid module or the multi-clutch device and/or by an axially offset electrical machine coupled to the gear element via a gear. To form the gear, the hybrid module includes a further gear wheel between the electrical machine and the multi-clutch device or its gear element for the purpose of transmitting a rotary movement or torque between the electrical machine and the multi-clutch device.

In an example embodiment of the multi-clutch device or the hybrid module, a tolerance compensation element compensates for axially occurring tolerance chains of axially coupled components. This element can be a so-called shim disk or a set including a plurality of shim disks. Depending on the tolerance to be compensated, the axial extension or thickness of this shim disk or a shim disk set formed therefrom can be set. Accordingly, axial preloads on the axially interconnected components can be reduced or adjusted to a desired level.

The hybrid module can be installed in such a way that the actuation systems of the partial clutches and the gear element are delivered to the customer in the state that is mounted on the remaining part of the multi-clutch device, so that essentially the complete hybrid module can be installed there as an assembly in a drive train of a motor vehicle. Alternatively, the actuation systems of the partial clutches and the gear element may be delivered to the customer as individual components in addition to the remaining components of the multi-clutch device and are mounted there one after the other. In this case, it is advisable to attach the guide sleeve to the bearing sleeve only at the customer's location or to arrange the second pivot bearing on the bearing sleeve.

BRIEF DESCRIPTION OF THE DRAWINGS

The disclosure described above is explained in detail below based on the relevant technical background with reference to the associated drawing, which shows an example embodiment. The disclosure is in no way restricted by the purely schematic drawing, although it should be noted that the embodiment shown in the drawing is not limited to the dimensions shown. The single FIGURE shows a multi-clutch device according to the disclosure in a partial section.

DETAILED DESCRIPTION

The single FIGURE shows a multi-clutch device 1 in an embodiment according to the disclosure.

A separating clutch 20 is provided on a common axis of rotation 2 within a housing 10, connected to an input shaft 3. The inner plate carrier 24 of the separating clutch 20 is thus connected to the input shaft 3 in a rotationally fixed manner. The outer plate carrier 23 of the separating clutch 20 is a component of a common rotary part 31, which at the same time forms the outer plate carrier 43 of a first partial clutch 40 and the outer plate carrier 53 of a second partial clutch 50. Together, the first partial clutch 40 and the second partial clutch 50 form a dual-clutch device 30, the central component of which is the common rotary part 31.

The separating clutch 20 is actuated via a separating clutch actuation system 21, with which an axially acting force can be applied to a separating clutch actuating bearing 22 which is axially supported on the plate set of the separating clutch 20.

A first actuation system 41, which acts axially on a first actuation bearing 42, is also assigned to the first partial clutch 40. Correspondingly, a second actuation system 51, which acts axially on a second actuation bearing 52, is also assigned to the second partial clutch 50. The actuating bearings 42 acts axially on a first pressure pad 47 of the first partial clutch 40, and the actuation bearing 52 acts axially on a second pressure pad 57 of the second partial clutch 50. Pressure pads 47 and 57 direct axial forces on the plate set of the first partial clutch 40 and the plate set of the second partial clutch 50, respectively, to press the plates together and thus to transmit torque.

The inner plate carrier 44 of the first partial clutch 40 is connected via a first toothing 45 to a first output shaft 46, which can also be a first gear input shaft of a dual-clutch gear. The inner plate carrier 54 of the second partial clutch 50 is connected via a second toothing 55 to a second output shaft 56, which can correspondingly also be a second gear input shaft of a dual-clutch gear.

It is provided according to the disclosure that the common rotary part 31 connecting the clutches 20, 40, 50 has an external toothing 32 which meshes with the internal toothing 61 of a gear element 60 of the multi-clutch device 1. Correspondingly, a torque can be transmitted from an electrical machine (not shown here) coupled to the gear element 60, via the gear element 60 and the external toothing 32 of the common rotary part 31 to the same and consequently to the clutches 20, 40, 50. For this purpose, the gear element 60 has an external gear toothing 62, which can mesh with a further gear wheel (not shown here) on the axis of rotation of a connected electrical machine.

The common rotary part 31 is rotatably mounted on or in the housing 2 by means of a first pivot bearing 70. The gear element 60 is rotatably mounted by means of a second pivot bearing 71. In the embodiment shown, the second pivot bearing 71 is supported radially on a bearing sleeve 110, which in turn is positioned and held radially and axially by a guide sleeve 100. For this purpose, the guide sleeve 100 has a stop 104, against which the bearing sleeve 110 rests axially. A side of the guide sleeve 100 that forms this stop 104 simultaneously forms a running surface 103 for the arrangement of the second actuation system 51 for the second partial clutch or for a sealingly mounted piston element of the second actuation system 51 that is displaceable thereon.

It is provided according to the disclosure that a clutch cover 90, which extends essentially radially, is provided as a component part of the common rotary part 31 or also arranged fixedly thereon. A clamping device 80 is arranged axially between the gear element 60 and the clutch cover 90, which exerts an axial force 81 in opposite directions on the gear element 60 and on the clutch cover 90, so that the gear element 60 and the common rotary part 31 are axially clamped against one another correspondingly. Due to the mounting of the gear element 60 by the second pivot bearing 71, and the mounting of the common rotary part 31 by the first pivot bearing 70, these two pivot bearings 70, 71 are also axially clamped against one another. Correspondingly, any axial play is removed from the two pivot bearings 70, 71 and the components arranged thereon—the common rotary part 31 and the gear element 60—are also positioned without play in the axial direction, so that operational play is prevented and, accordingly, wear of the connected clutches 20, 40, 50 is reduced.

Furthermore, the first partial clutch 40 is assigned a first compression spring device 91, which is axially supported on the first pressure pad 47 and on the clutch cover 90, and the second partial clutch 50 is assigned a second compression spring device 92, which is axially supported on the second pressure pad 57 and the clutch cover 90.

The function of the respective compression spring devices 91, 92 is the automatic opening of the respective partial clutch 40, 50 when this is not closed by the first actuation system 41 or the second actuation system 51.

Furthermore, in the embodiment of the multi-clutch device 1 shown here, it is provided that the guide sleeve 100 is designed with a radially extending section 101, on which a shaped element 102 is arranged or formed, which serves to position a housing component 120 of the first actuation system 41 of the first partial clutch 40. In the embodiment shown here, an O-ring 121 is provided as a seal between a hydraulic line 122 running radially through the housing component 120 and the radially extending section 101 of the guide sleeve 100 to surround the housing component 120 with respect to the guide sleeve 100 or the radially extending section 101 and to be sealed in accordance with the coupling space which is radially limited thereby.

Furthermore, the multi-clutch device 1 shown includes a tolerance compensation element 130, in particular a so-called shim disk, for compensation of axial tolerance chains of components mechanically connected to one another.

With the multi-clutch device proposed here, a device is provided which combines low wear with a small axial space requirement.

REFERENCE NUMERALS

1 Multi-clutch device
2 Common axis of rotation
3 Input shaft
10 Housing
20 Separating clutch
21 Separating clutch actuation system
22 Separating clutch actuation bearing 23 Outer plate carrier of the separating clutch
24 Inner plate carrier of the separating clutch
30 Dual-clutch device
31 Common rotary part
32 External toothing
40 First partial clutch
41 First actuation system
42 First actuation bearing
43 Outer plate carrier of the first partial clutch
44 Inner plate carrier of the first partial clutch
45 First toothing
46 First output shaft
47 First pressure pad
50 Second partial clutch
51 Second actuation system
52 Second actuation bearing
53 Outer plate carrier of the second partial clutch
54 Inner plate carrier of the second partial clutch
55 Second toothing
56 Second output shaft
57 Second pressure pad
60 Gear element
61 Internal toothing
62 External gear toothing
70 First pivot bearing
71 Second pivot bearing
80 Clamping device
81 Axial force
90 Clutch cover
91 First compression spring device
92 Second compression spring device
100 Guide sleeve
101 Radially extending section
102 Shaped element
103 Running surface
104 Stop
110 Bearing sleeve
120 Housing component
121 O-ring
122 Hydraulic line
130 Tolerance compensation element

The invention claimed is:

1. A multi-clutch device for a hybrid module, comprising:
a separating clutch for transmitting torque from an internal combustion engine to the multi-clutch device;
a dual-clutch device for transmitting torque from the separating clutch or an electrical machine to a drivetrain, comprising:
 a first partial clutch; and
 a second partial clutch;
a first pivot bearing;
a common rotary part:
 mounted rotatably in an axial or radial direction by the first pivot bearing; and
 coupling the separating clutch, the first partial clutch, and the second partial clutch in a rotationally fixed manner;
a second pivot bearing;
a gear element:
 mounted rotatably in the axial or radial direction by the second pivot bearing; and
 forming a gear between the electrical machine and the multi-clutch device for transmitting a rotary movement between the electrical machine and the multi-clutch device; and
a clamping device for:
 clamping the common rotary part and the gear element against each other in the axial direction; and
 clamping the first pivot bearing and the second pivot bearing against each other in the axial direction.

2. The multi-clutch device of claim 1, wherein:
the clamping device is axially supported on the gear element on one side; and
the clamping device is axially supported on the common rotary part or on a component axially fixed to the common rotary part on the other side.

3. The multi-clutch device of claim 2, further comprising a clutch cover axially fixed to the common rotary part or formed by the common rotary part, wherein:
the clamping device is configured as a compression spring or a compression spring set; and
the clamping device is supported on the clutch cover on one axial side and is supported on the gear element on the other axial side.

4. The multi-clutch device of claim 3, wherein:
the first partial clutch comprises a first compression spring device axially supported on the clutch cover for automatic opening of the first partial clutch in a non-actuated state; and
the second partial clutch comprises a second compression spring device axially supported on the clutch cover for automatic opening of the second partial clutch in the non-actuated state.

5. The multi-clutch device of claim 1, wherein:
the multi-clutch device comprises a housing and the first pivot bearing is supported radially or axially on the housing; or
the multi-clutch device comprises a guide sleeve and the second pivot bearing is supported radially or axially on the guide sleeve.

6. The multi-clutch device of claim 5, wherein:
the multi-clutch device comprises the guide sleeve and a bearing sleeve;
the guide sleeve comprises an axial stop; and
the clamping device presses the bearing sleeve axially against the axial stop.

7. The multi-clutch device of claim 1, wherein:
the gear element is a gear wheel with an internal toothing;
the common rotary part comprises a first external toothing; and
the internal toothing meshes with the first external toothing.

8. The multi-clutch device of claim 7, wherein the gear wheel comprises a second external toothing arranged for forming a gear between the electrical machine and the multi-clutch device to transmit a rotary movement between the electrical machine and the multi-clutch device.

9. The multi-clutch device of claim 5, wherein:
the multi-clutch device further comprises:
 an o-ring;
 an actuation system for the first partial clutch or the second partial clutch; and
 the guide sleeve;
the guide sleeve comprises a radially extending section; and
the actuation system is axially sealed to the radially extending section by the o-ring.

10. A hybrid module, comprising:
the multi-clutch device of claim 1 further comprising an axis of rotation; and
the electrical machine comprising a rotor for generating drive torque, wherein:
   the rotor is arranged axially parallel to the axis of rotation; and
   the rotor is connected to the multi-clutch device by the gear.

\* \* \* \* \*